US009285591B1

(12) United States Patent
Gupta et al.

(10) Patent No.: US 9,285,591 B1
(45) Date of Patent: Mar. 15, 2016

(54) COMPACT ARCHITECTURE FOR NEAR-TO-EYE DISPLAY SYSTEM (71) Applicant: Google Inc., Mountain View, CA (US)

(72) Inventors: Anurag Gupta, San Jose, CA (US); Amber M. Luttmann, Fremont, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/473,578

(22) Filed: Aug. 29, 2014

(51) Int. Cl.
*G02B 27/14* (2006.01)
*G09G 5/00* (2006.01)
*G02B 27/01* (2006.01)
*G02B 25/00* (2006.01)
*H04N 13/02* (2006.01)

(52) U.S. Cl.
CPC .......... *G02B 27/0172* (2013.01); *G02B 25/001* (2013.01); *G02B 27/01* (2013.01); *G02B 27/0101* (2013.01); *G02B 27/017* (2013.01); *G02B 2027/011* (2013.01); *G02B 2027/0123* (2013.01); *G02B 2027/0178* (2013.01); *H04N 13/0278* (2013.01)

(58) Field of Classification Search
CPC .. G02B 27/01; G02B 27/0101; G02B 27/017; G02B 27/0172; G02B 2027/0118; G02B 2027/0123; G02B 2027/0178; H04N 13/0278; G06F 3/011; G06F 3/147
USPC .......... 359/629–631, 633, 634, 636; 345/7–9, 345/633; 348/56, 58, 148
See application file for complete search history.

(56) References Cited

U.S. PATENT DOCUMENTS

| 4,711,512 | A | 12/1987 | Upatnieks |
| 5,076,664 | A | 12/1991 | Migozzi |
| 5,093,567 | A | 3/1992 | Staveley |
| 5,539,422 | A | 7/1996 | Heacock et al. |

(Continued)

FOREIGN PATENT DOCUMENTS

| EP | 1 300 716 A1 | 4/2003 |
| EP | 1 295 163 B1 | 7/2010 |

(Continued)

OTHER PUBLICATIONS

Levola, T., "Diffractive Optics for Virtual Reality Displays", Academic Dissertation, Joensuu 2005, University of Joensuu, Department of Physics, Vaisala Laboratory, 26 pages.

(Continued)

*Primary Examiner* — Loha Ben
(74) *Attorney, Agent, or Firm* — Blakely Sokoloff Taylor & Zafman LLP (57) ABSTRACT An eyepiece body of an eyepiece includes an input lens positioned to couple display light into the eyepiece body along a forward propagation path, a concave end reflector disposed at an opposite end of the eyepiece body from the input lens to reflect the display light back along a reverse propagation path, and a viewing region including a partially reflective surface that redirects at least a portion of the display light traveling along the reverse propagation path out of an eye-ward side of the eyepiece body along an emission path. The partially reflective surface is obliquely angled relative to the eye-ward side and the concave end reflector is titled relative to a top or bottom surface of the eyepiece body to collectively cause the emission path of the display light to be oblique to a normal vector of the eye-ward side in two orthogonal dimensions.

20 Claims, 6 Drawing Sheets

(56) References Cited

U.S. PATENT DOCUMENTS

| | | | |
|---|---|---|---|
| 5,539,578 | A | 7/1996 | Togino et al. |
| 5,621,424 | A * | 4/1997 | Shimada ............... G02B 27/017 345/8 |
| 5,696,521 | A | 12/1997 | Robinson et al. |
| 5,708,529 | A | 1/1998 | Togino et al. |
| 5,715,337 | A | 2/1998 | Spitzer et al. |
| 5,771,124 | A | 6/1998 | Kintz et al. |
| 5,815,126 | A | 9/1998 | Fan et al. |
| 5,844,530 | A | 12/1998 | Tosaki |
| 5,886,822 | A | 3/1999 | Spitzer |
| 5,896,232 | A | 4/1999 | Budd et al. |
| 5,926,318 | A | 7/1999 | Hebert |
| 5,943,171 | A | 8/1999 | Budd et al. |
| 5,949,583 | A | 9/1999 | Rallison et al. |
| 6,023,372 | A | 2/2000 | Spitzer et al. |
| 6,091,546 | A | 7/2000 | Spitzer |
| 6,172,657 | B1 | 1/2001 | Kamakura et al. |
| 6,185,045 | B1 * | 2/2001 | Hanano ............... G02B 27/0172 359/630 |
| 6,201,629 | B1 | 3/2001 | McClelland et al. |
| 6,204,974 | B1 | 3/2001 | Spitzer |
| 6,222,677 | B1 | 4/2001 | Budd et al. |
| 6,349,001 | B1 | 2/2002 | Spitzer |
| 6,353,492 | B2 | 3/2002 | McClelland et al. |
| 6,353,503 | B1 | 3/2002 | Spitzer et al. |
| 6,356,392 | B1 | 3/2002 | Spitzer |
| 6,384,982 | B1 | 5/2002 | Spitzer |
| 6,396,639 | B1 | 5/2002 | Togino et al. |
| 6,518,939 | B1 * | 2/2003 | Kikuchi ............... G06F 3/147 345/7 |
| 6,538,799 | B2 | 3/2003 | McClelland et al. |
| 6,618,099 | B1 | 9/2003 | Spitzer |
| 6,671,100 | B1 | 12/2003 | McRuer |
| 6,690,516 | B2 | 2/2004 | Aritake et al. |
| 6,701,038 | B2 | 3/2004 | Rensing et al. |
| 6,724,354 | B1 | 4/2004 | Spitzer et al. |
| 6,738,535 | B2 | 5/2004 | Kanevsky et al. |
| 6,747,611 | B1 | 6/2004 | Budd et al. |
| 6,829,095 | B2 | 12/2004 | Amitai |
| 6,864,861 | B2 | 3/2005 | Schehrer et al. |
| 6,879,443 | B2 | 4/2005 | Spitzer et al. |
| 7,158,096 | B1 | 1/2007 | Spitzer |
| 7,242,527 | B2 | 7/2007 | Spitzer et al. |
| 7,253,960 | B2 | 8/2007 | Yamazaki et al. |
| 7,391,573 | B2 | 6/2008 | Amitai |
| 7,457,040 | B2 | 11/2008 | Amitai |
| 7,576,916 | B2 | 8/2009 | Amitai |
| 7,577,326 | B2 | 8/2009 | Amitai |
| 7,643,214 | B2 | 1/2010 | Amitai |
| 7,663,805 | B2 | 2/2010 | Zaloum et al. |
| 7,672,055 | B2 | 3/2010 | Amitai |
| 7,724,441 | B2 | 5/2010 | Amitai |
| 7,724,442 | B2 | 5/2010 | Amitai |
| 7,724,443 | B2 | 5/2010 | Amitai |
| 7,843,403 | B2 | 11/2010 | Spitzer |
| 7,900,068 | B2 | 3/2011 | Weststrate et al. |
| 8,004,765 | B2 | 8/2011 | Amitai |
| 8,335,041 | B2 * | 12/2012 | Kubota ............... G02B 27/0172 359/629 |
| 8,724,206 | B2 * | 5/2014 | Spitzer ............... G02B 5/30 359/241 |
| 8,760,765 | B2 * | 6/2014 | Gupta ............... G02B 27/0172 345/8 |
| 8,786,686 | B1 * | 7/2014 | Amirparviz ............ H04N 13/04 345/8 |
| 8,867,139 | B2 * | 10/2014 | Gupta ............... G02B 27/0018 345/8 |
| 2003/0090439 | A1 | 5/2003 | Spitzer et al. |
| 2005/0174651 | A1 | 8/2005 | Spitzer et al. |
| 2006/0192306 | A1 | 8/2006 | Giller et al. |
| 2006/0192307 | A1 | 8/2006 | Giller et al. |
| 2007/0217017 | A1 | 9/2007 | Ichikawa |
| 2008/0219025 | A1 | 9/2008 | Spitzer et al. |
| 2009/0122414 | A1 | 5/2009 | Amitai |
| 2010/0046070 | A1 | 2/2010 | Mukawa |
| 2010/0066926 | A1 | 3/2010 | Tanijiri |
| 2010/0103078 | A1 | 4/2010 | Mukawa et al. |
| 2010/0149073 | A1 | 6/2010 | Chaum et al. |
| 2010/0278480 | A1 | 11/2010 | Vasylyev |
| 2011/0019250 | A1 | 1/2011 | Aiki et al. |
| 2011/0213664 | A1 | 9/2011 | Osterhout et al. |
| 2013/0033756 | A1 | 2/2013 | Spitzer et al. |
| 2013/0127980 | A1 | 5/2013 | Haddick et al. |
| 2013/0242392 | A1 | 9/2013 | Amirparviz et al. |
| 2013/0242405 | A1 | 9/2013 | Gupta |
| 2014/0153103 | A1 | 6/2014 | Gupta |
| 2015/0002941 | A1 * | 1/2015 | Gupta ............... G02B 27/0018 359/631 |

FOREIGN PATENT DOCUMENTS

| | | |
|---|---|---|
| GB | 2 272 980 A | 6/1994 |
| JP | 10-253919 A | 9/1998 |
| JP | 2000-214409 | 8/2000 |
| JP | 2002-014300 A | 1/2002 |
| JP | 2012063638 A | 3/2012 |
| KR | 2013-0136394 A | 12/2013 |
| WO | WO 96/05533 A1 | 2/1996 |
| WO | WO 97/25646 A1 | 7/1997 |

OTHER PUBLICATIONS

Mukawa, H. et al., "8.4: *Distinguished Paper:* A Full Color Eyewear Display using Holographic Planar Waveguides", SID Symposium Digest of Technical Papers, May 2008, vol. 39, Issue 1, pp. 89-92.

PCT/US2013/029668; PCT International Search Report and Written Opinion, mailed Jun. 4, 2013, 7 pages.

PCT/US2013/070145, PCT International Search Report and Written Opinion, mailed Feb. 26, 2014, 13 pages.

U.S. Appl. No. 13/423,672, filed Mar. 19, 2012, U.S. Notice of Allowance mailed Mar. 26, 2014 (23 pages).

U.S. Appl. No. 13/714,171, filed Dec. 13, 2012, U.S. Office Action mailed May 21, 2014 (29 pages).

U.S. Appl. No. 13/714,171, filed Dec. 13, 2012, U.S. Notice of Allowance mailed Aug. 14, 2014 (23 pages).

PCT/US2015/042115; PCT International Search Report and Written Opinion of the International Searching Authority, mailed Oct. 22, 2015, 10 pages.

* cited by examiner

COMPACT ARCHITECTURE FOR NEAR-TO-EYE DISPLAY SYSTEM

TECHNICAL FIELD

This disclosure relates generally to the field of optics, and in particular but not exclusively, relates to head mounted displays.

BACKGROUND INFORMATION

A head mounted display ("HMD") (also referred to as a head wearable display) is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI") while blocking the user's external view. These HMD displays are often referred to as virtual reality ("VR") displays. Other HMDs are capable of superimposing CGI over a real-world view. This latter type of HMD can serve as the hardware platform for realizing augmented reality ("AR"). With AR the viewer's image of the world is augmented with an overlaying CGI. Another term used to refer to various types of HMDs is a heads-up display ("HUD"). A HUD is any display that permits the user to view a CGI without having to look down or otherwise taking their eyes significantly off their head up forward position. Both VR and AR HMDs can be implemented as HUDs.

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, limited field of view, small eyebox, or poor efficiency of conventional optical systems used to implement existing HMDs. In particular, conventional HMDs often restrict the users view of the external world, making them awkward to wear during regular daily activities.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system, and method of operation of an eyepiece for a head wearable display that outputs display light along a tilted emission path that tilts in two dimensions are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
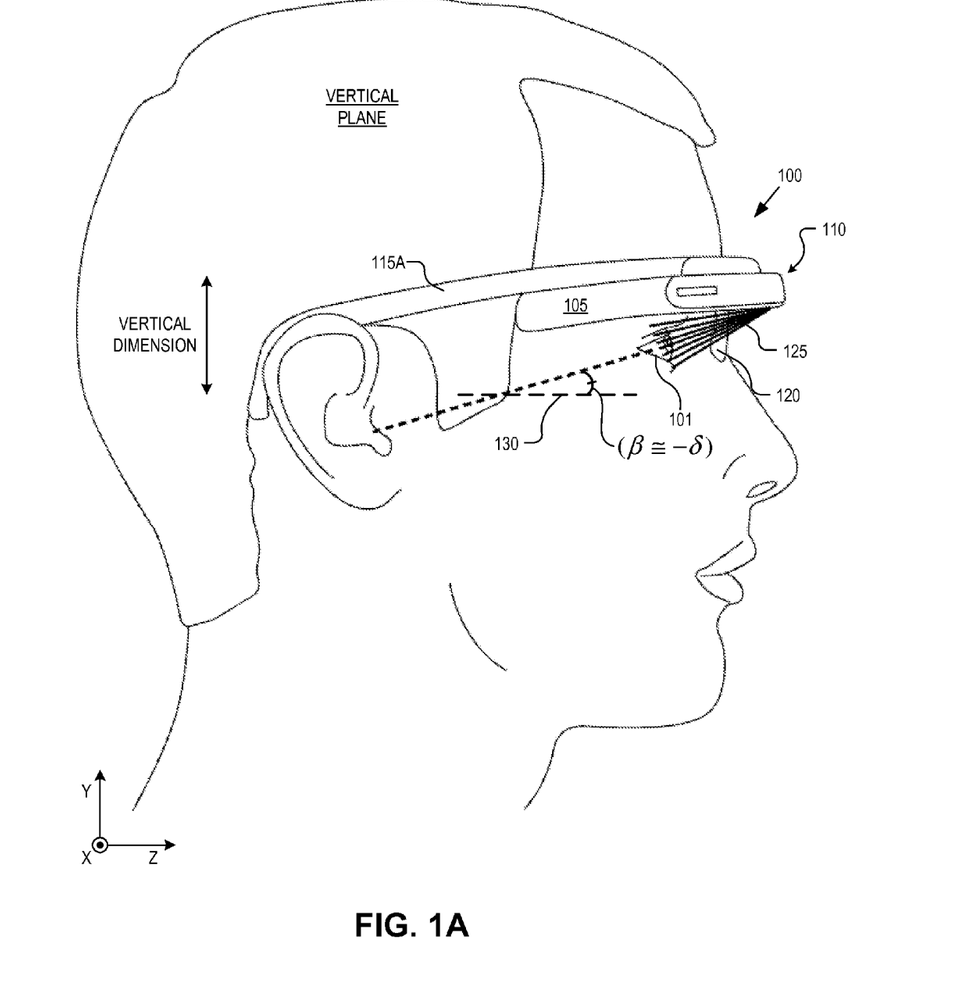
FIGS. 1A-1C illustrate different views of a head wearable display for wearing offset from a user's eyes, in accordance with an embodiment of the disclosure.
Figure 1B:
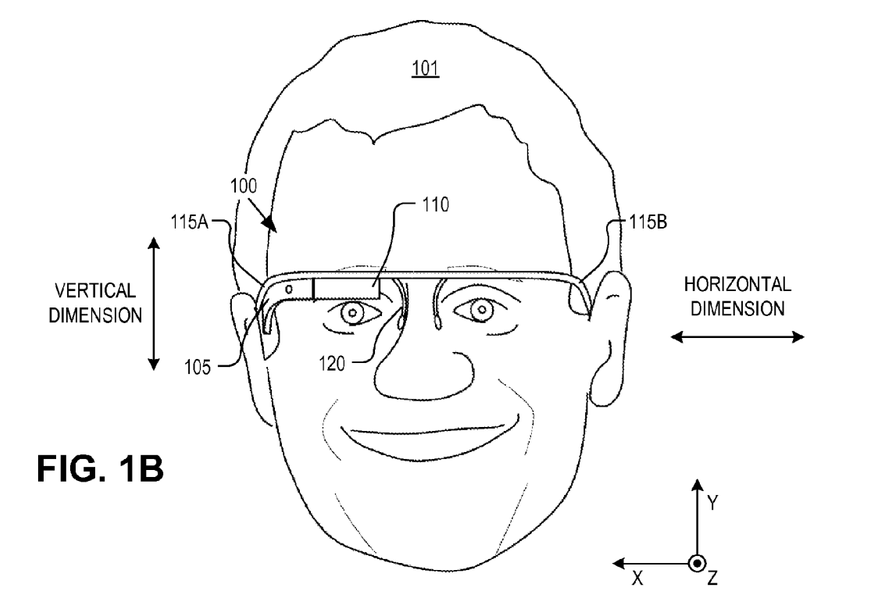
Figure 1C:
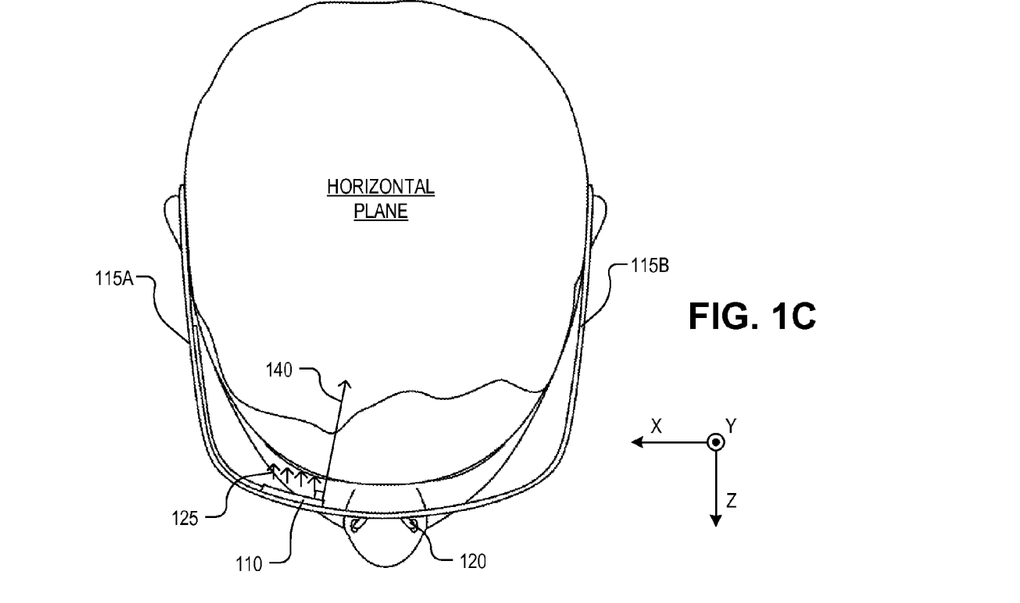

FIGS. 1A-1C illustrate a head wearable display 100 that supports an eyepiece offset from a user's eye(s) 101 and emits display light along a tilted emission path that tilts in two dimensions, in accordance with an embodiment of the disclosure. The illustrated embodiment of display 100 includes an electronics housing 105 and eyepiece 110 supported on the head of the user by a frame assembly. The illustrated frame assembly includes a right ear arm 115A, left ear arm 115B, and a nose bridge 120. Display 100 may be implemented as a monocular embodiment that includes a single eyepiece 110 for displaying display light 125 to a single eye 101 (illustrated) or a binocular embodiment that includes dual eyepieces 110 for displaying display light to both eyes (not illustrated).

Electronics housing 105 and eyepiece 110 are secured into an eyeglass arrangement that can be worn on the head of a user either above (illustrated) or below (not illustrated) the users eyes 101. The left and right ear arms rest over the user's ears while nose bridge 120 rests over the user's nose. The frame assembly is shaped and sized to position an eyepiece 110 in a near-to-eye configuration above (or below) the user's central forward vision. Of course, other frame assemblies having other shapes may be used (e.g., a single contiguous headset member, a headband, goggles type eyewear, etc.). By positioning eyepiece 110 above the user's eyes, display 100 does not constrain the lateral field of view ("FOV") of the user's forward vision. Eyepiece 110 is designed to emit display light 125 along an emission path that is tilted down towards the user's eye 101. The vertically tilted emission path is achieved by tilting an end reflector located at a distal end of eye piece 100 (discussed below). The external side surfaces of eyepiece 110 can maintain a vertical or near vertical position even though the emission path is angled down, thus improving the industrial design of display 100 and maintaining pleasing aesthetics. To view display light 125, the user need only tilt their gaze upward by a gazing angle $\beta$ above horizontal 130 (or downward in the cases of eyepiece 110 suspended below the eye) to align with the downward tilt angle $\delta$ of display light 125 emitted from eyepiece 110. In one embodiment, the frame assembly is designed to hold eyepiece 110 relative to eye 101, such that tilt angle δ=−6.7 degrees±1 degree will centrally position the image on eye 101 when the user lifts their gazing angle β by a corresponding angle. In other words, to view CGI light 101, β≅−δ. Other vertical tilt angles may be implemented.

As illustrated in FIG. 1C, eyepiece 110 is also mounted to the frame assembly such that its proximal end near electronics housing 105 is angled inward towards the user's temple (toes-in). Again, this toeing-in configuration can improve the industrial design of display 100, since the eyepiece 110 more closely follows the contours of the user's head. In the illustrated embodiment, eyepiece 110 has a rectangular box shape with flat, planar top, bottom, eye-ward, and scene side surfaces. As such, the emission path of display light 125 is also obliquely angled in the horizontal plane relative to the normal vector 140 of the eye-ward side of eyepiece 110. By performing dual oblique angle bending internal to a rectangular box shape eyepiece, industrial design and aesthetics are improved along with eye safety. Eye safety is improved since an irregular shaped eyepiece is not positioned near the user's eye to achieve the oblique light bending along dual axes.

The illustrated embodiment of display 100 is capable of displaying a display image (e.g., computer generated image) to the user in the form of a heads up display ("HUD") without undue obstruction of their forward vision. In one embodiment, the viewing region of eyepiece 110 is partially transparent, which further permits the user to see the external real world through eyepiece 110 even when they look up. When looking up, display light 125 may be seen by the user as virtual images superimposed over the real world as an augmented reality. In some embodiments, eyepiece 110 may be opaque and block their upward external vision. Electronics housing 105 may house various electronic components for operation of display 100 such as a power supply, a graphics engine, a microprocessor, input/output circuitry, a wireless transceiver, memory, a display panel, etc.

Figure 2A:
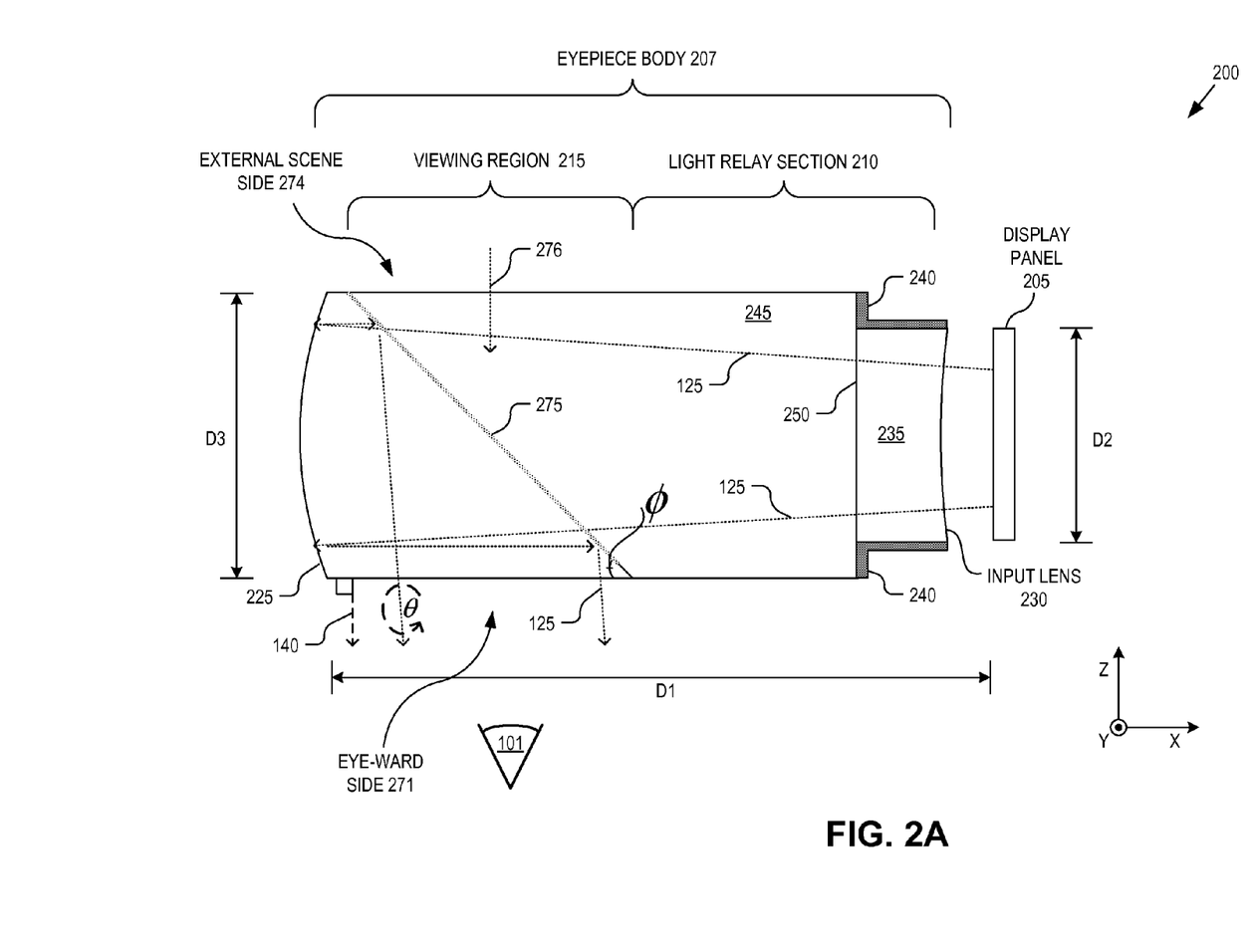
FIGS. 2A-2C illustrate various side/cross-sectional views of an eyepiece for a head wearable display that outputs display light along a tilted emission path that tilts in two dimensions, in accordance with an embodiment of the disclosure.
Figure 2B:
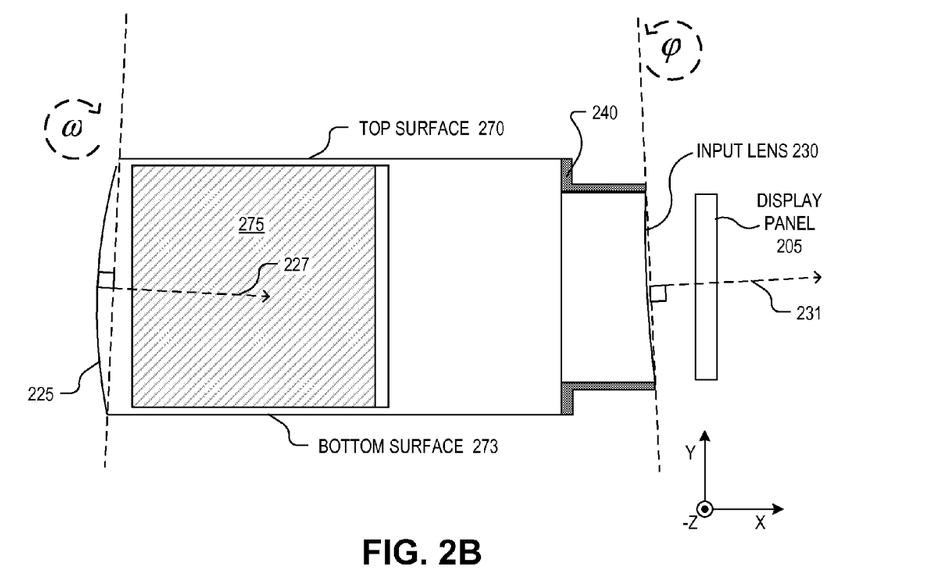
Figure 2C:
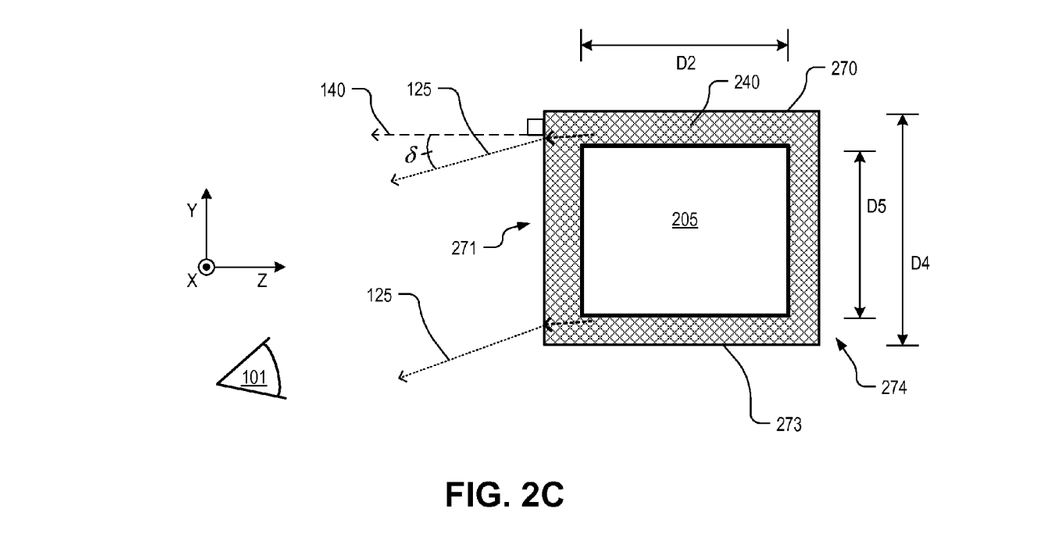

FIGS. 2A-2C illustrate various side/cross-sectional views of an eyepiece 200 that outputs display light along a tilted emission path that tilts in two dimensions, in accordance with an embodiment of the disclosure. Eyepiece 200 is one possible implementation of eyepiece 110 illustrated in FIGS. 1A-C. The illustrated embodiment of eyepiece 200 includes a display panel 205 and an eyepiece body 207. The illustrated embodiment of eyepiece body 207 includes a light relay section 210, a viewing region 215, an end reflector 225, and an input lens 230. The illustrated embodiment of light relay section 210 includes a small section 235, light blocks 240, and large section 245. The illustrated embodiment of viewing region 215 is a see-through region with an out-coupling beam splitter having a partially reflective surface 275. Viewing region 215 includes an eye-ward side 271 for emission of display light 125 towards eye 101 and an external scene side 274 through which, in some embodiments, ambient light 276 may pass.

In the illustrated embodiment, light relay section 210 and viewing region 215 are made of two pieces (e.g., plastic or glass pieces) mated together at oblique interfaces between which partially reflective surface 275 is disposed. In the illustrated embodiment, light relay section 210 is also made of two pieces (e.g., plastic or glass pieces) mated together at interface 250 where the small section 235 steps up to large section 245. In other embodiments, the small and large sections 235 and 245 may be fabricated of one monolithic component.

FIGS. 2A-2C illustrate an embodiment where the various sections of eyepiece 200 are cuboids with right-angled exterior sides. For example, eye-ward side 271, external scene side 274, as well as, top surface 270 and bottom surface 273 (see FIG. 2B) are flat, planar surfaces. In other embodiments, one or more of the various sections and exterior surfaces of eyepiece 200 may have one or more non-right-angled exterior sides (e.g., a parallelogram) or curvatures.

In the illustrated embodiment, end reflector 225 is a concave mirror surface (e.g., metal coated surface) formed into the distal end of eyepiece body 207. End reflector 225 is tilted or tipped by an angle ω (see FIG. 2B) such that its normal vector 227 extending from the center point of end reflector 225 does not run parallel to top surface 270 or bottom surface 273. In the illustrated embodiment, normal vector 227 points down for a HMD configuration where eyepiece 200 is positioned above eye 101. For an emission path of display light 125 that is obliquely angled down in the vertical dimension by δ=6.7 degrees, end reflector 225 may be tilted by an angle ω=2.1 degrees. Of course, other tilt angles may be implemented for ω and δ.

In the illustrated embodiment, partially reflective surface 275 is implemented as a non-polarization selective beam splitter (e.g., 50/50 beam splitter). In order to achieve an emission path of display light 125 that is obliquely angled left or right in the horizontal dimension, partially reflective surface 275 is obliquely angled relative to eye-ward side 271 with an offset from 45 degrees. For example, the angle φ between eye-ward side 271 and partially reflective surface 275 may be φ=43 degrees to achieve an angle θ=6 degrees tilt relative to normal vector 140 in the horizontal dimension. This tilt allows the proximal end of eyepiece body 207 near display panel 205 of eyepiece 200 to be toed-in towards the user's temple by 6 degrees while permitting the user to look straight forward to see display light 125. Angling partially reflective surface 275 in the opposite direction past 45 degrees would permit the proximal end of eyepiece body 207 to be toed-out. Of course, other tilt angles may be implemented for φ. In other embodiments, partially reflective surface 275 may be implemented as a polarizing beam splitter ("PBS") when display light 125 is polarized.

Input lens 230 is positioned to couple display light 125 output from display panel 205 into eyepiece body 207. In one embodiment, input lens 230 is a spherical lens having an optical power that directs display light 125 to end reflector 225 along a forward propagation path through eyepiece body 207. Input lens 230 provides a mechanism to facilitate adjustments in the length D1 of eyepiece body 207 and/or the active area size of display panel 205 while maintaining a fixed field of view. Furthermore, by tilting input lens 230 in the X-Y plane about the Z-axis by a tilt angle φ, chromatic compensation is introduced to offset the chromatic distortion introduced by the tilt angle ω of end reflector 225. In other words, a normal vector 231 extending from the center point of input lens 230 tilts obliquely relative to top surface 270 or bottom surface 273 and intersects display panel 205 obliquely. In the illustrated embodiment, normal vector 231 is tilted in an opposite or complementary direction as normal vector 227 to provide chromatic compensation. In one embodiment, tilt angle φ=1.4 degrees.

Input lens 230 has a curvature that is determined, at least in part, based upon the size of display panel 205, the size of eyepiece body 207, the refractive index of eyepiece body 207, and optical power of end reflector 225. In one embodiment, input lens 230 has a radius of curvature R1=14.2 mm, display panel 205 has an active area size of D5=3.2 mm by D2=5.8 mm, eyepiece body 207 has a size of D1=32 mm, D3=8 mm, D4=10 mm, display panel 205 is offset from input lens 230 with by an air gap of 4 mm, end reflector 225 has a radius of curvature R2=65.2 mm, and eyepiece body 207 is formed of optical grade Zeonex-E48R. This embodiment provides an eyebox diameter of approximately 4 mm, an eye relief of 15-25 mm, and a field of view of approximately 15 degrees. Of course, the above dimensions, angles, curvatures, and materials are merely demonstrative and other dimensions, angles, curvatures, and materials may be used according to design choice.

Figure 3:
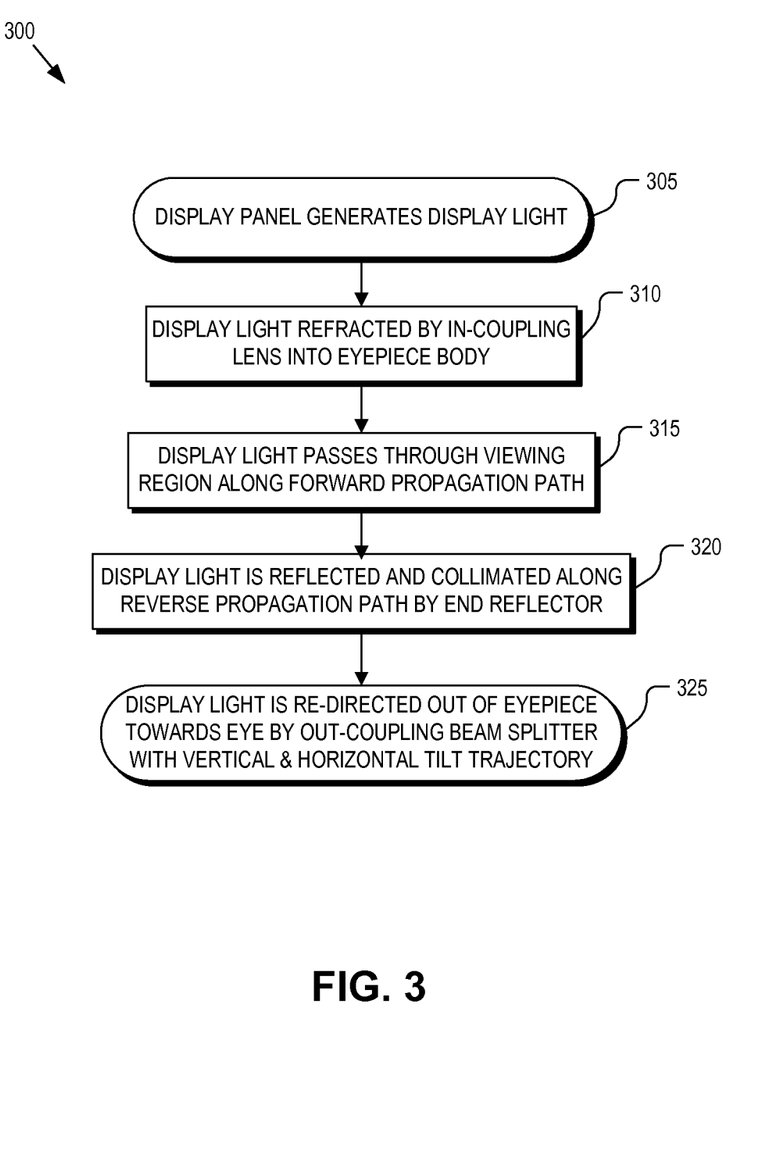
FIG. 3 is a flow chart illustrating a process of operation of an eyepiece that outputs display light along a dual tilted emission path, in accordance with an embodiment of the disclosure.

FIG. 3 is a flow chart illustrating a process 300 of operation of eyepiece 200, in accordance with an embodiment of the disclosure. Process 300 is described with reference to FIGS. 2A-2C. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, display panel 205 outputs display light 125 towards input lens 230. Display panel 205 may be implemented using a variety of micro-display technologies including liquid crystal on silicon ("LCoS") panels, digital micro-mirror displays, organic light emitting diode ("OLED") displays, micro LED displays, liquid crystal displays ("LCD"), or otherwise.

In a process block 310, display light 125 is coupled into eyepiece body 207 via input lens 230. Input lens 230 also focuses display light 125 to control the field of view seen by the user and impart color compensation.

In a process block 315, display light 125 propagates down light relay section 210 along a forward propagation path towards viewing region 215. In the illustrated embodiment, display light 125 is directed along the forward propagation path within light relay section 210 without need of total internal reflection ("TIR"). In other words, the cross sectional shape and divergence of the light cone formed by display light 125 is confined by input lens 230 such that the light rays reach end reflector 225 without need of TIR off the sides of light relay section 210.

Light relay section 210 and viewing region 215 may be fabricated of a number of materials including glass, optical grade plastic, fused silica, PMMA, Zeonex-E48R, or otherwise. The length of light relay section 210 may be selected based upon the temple-eye separation of the average adult. The combined optical power of input lens 230 and end reflector 225 are selected based upon this temple-eye separation and a desired field of view with an eye relief of approximately 15 to 25 mm.

The illustrated embodiment of light relay section 210 includes light blocks 240 disposed on the exposed edges of large section 245 and small section 235 about the step interface 250 between these two sections. Light blocks 240 reduce external light from leaking into light relay section 210. Light blocks 240 may be matte opaque paint, a opaque collar extending around small section 235, or otherwise. In other embodiments, light relay section 210 may not include a small section 235, rather the entire length of light relay section 210 may have a continuous sloped cross-section or a constant size cross-section as opposed to an abrupt step at the junction between the large and small cross-sections. In one embodiment, input lens 230 has a cross-sectional size of 7 mm by 7 mm and the step between large section 245 and small section 235 is approximately 1.5 mm. Other dimensions may be implemented.

In a process block 315, display light 125 passes across viewing region 215 and through partially reflective surface 275. Of course, in an embodiment where partially reflective surface 275 is a 50/50 beam splitter, half of the light is transmitted through to end reflector 225 while the other half is reflected out external scene side 274. In an embodiment where partially reflective surface 275 is a PBS (not illustrated), a quarter-wave plate polarization rotator may be included between partially reflective surface 275 and end reflector 225.

In a process block 320, display light 125 is reflected back along a reverse propagation path by end reflector 225. In one embodiment, end reflector 225 is a concave reflector and has a shape to substantially collimate display light 125 reflected along the reverse propagation path. Collimating the display light has an effect of virtually displacing the display image at or near infinity thereby helping the human eye 101 to bring the display image into focus in a near-to-eye configuration. Of course, end reflector 225 may reduce the divergence without fully collimating the light, thereby displacing the virtual image at a location less than infinity (e.g., 0.5 m to 3 m).

In a process block 325, display light 125 travelling along the reverse propagation path is reflected by partially reflective surface 275 and redirected out of eyepiece 200 through eye-ward side 271 towards eye 101. In the illustrated embodiment, since partially reflective surface 275 is a 50/50 beam splitter, only a portion of display light 125 is reflected out of eyepiece 200 along the emission path while another portion passes through partially reflective surface 275 back towards display module 205. This undesirable back reflection portion does not cause ghosting effects visible by the user due to the off-axis shifting of the reflected display light 125 by the tilting of end reflector 225 and input lens 230. Additionally, a non-reflective display technology, such as LCD, further reduces deleterious ghosting. As discussed in connection with FIGS. 4A and 4B below, a gap in partially reflective surface 275 and eye-ward side 271 further aids in the reduction of ghosting.

Both end reflector 225 and partially reflective surface 275 are rotated or tilted to perform the dual axis light bending internal to eyepiece 200. It is noteworthy that the rotation angles ϕ and ω are smaller than the light bending that results in the emission path outside of eyepiece 200 due to the additional refractive bending that occurs when display light 125 exits through eye-ward side 271.

Figure 4A:
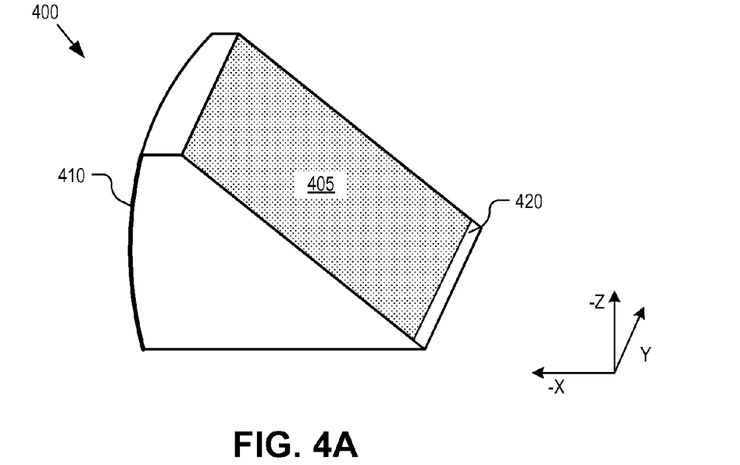
FIGS. 4A-4C illustrate various views of a partially reflective surface and end reflector for reflecting display light out of an eyepiece along a dual tilted emission path, in accordance with an embodiment of the disclosure.
Figure 4B:
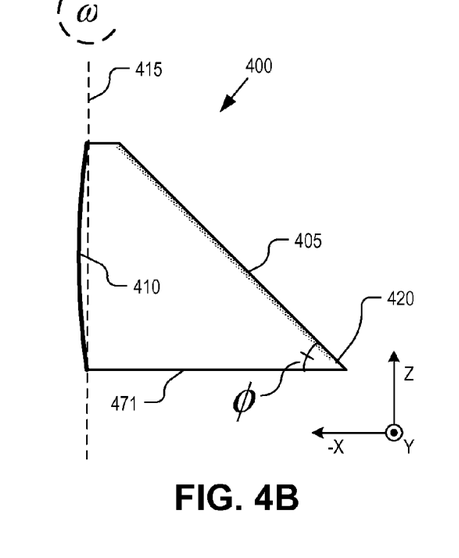
Figure 4C:
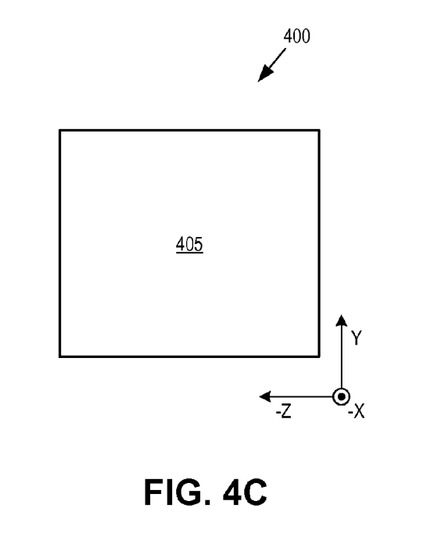

FIGS. 4A-4C illustrate various views of a component 400 for reflecting display light out of an eyepiece along a dual tilted emission path, in accordance with an embodiment of the disclosure. Component 400 includes partially reflective surface 405 and end reflector 410 and is one example for implementing one of the two pieces of viewing region 215 and light relay section 210 illustrated in FIG. 2A.

Partially reflective surface 405 may be implemented as a non-polarizing beam splitter (e.g., 50/50 beam splitter), such as a thin layer of silver, a polarizing beam splitter, or other multi-layer thin film structures. The illustrated embodiment of end reflector 410 is a concave surface coated with a reflective material, such as metal (e.g., silver). Partially reflective surface 405 is obliquely oriented relative to eye-ward side 471 by angle ϕ and controls horizontal tilt of the emission path in the horizontal plane. In particular, partially reflective surface 405 is offset from 45 degrees. For example, partially reflective surface 405 may be offset by 2 degrees such that angle ϕ=43 degrees, which results in 6 degrees of horizontal tilting of the emission path of the display light. Of course, other oblique angles for ϕ may be implemented.

In one embodiment, end reflector 410 is tilted or rotated clockwise about axis 415 by an angle ω about the Z-axis. The rotation of end reflector 410 about axis 415 results in a vertical tilt of the emission path. As discussed above, for an emission path of display light 125 that is obliquely angled down in the vertical dimension by δ=6.7 degrees, end reflector 225 may be tilted by an angle ω=2.1 degrees. Of course, other tilt angles may be implemented for ω.

In the illustrated embodiment, partially reflective surface 405 does not extend all the way to eye-ward side 471. Rather, in the illustrated embodiment, partially reflective surface 405 stops short of eye-ward side 471 leaving a gap 420 along the oblique surface. Gap 420, which represents an absence of the partially reflective coating, reduces ghosting due to deleterious back reflections. In one embodiment, gap 420 is approximately 1 mm in width along the oblique surface and extends along the full height of the oblique surface in the Y dimension.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece, comprising:
    an eyepiece body, including:
        an input lens positioned to couple display light into the eyepiece body along a forward propagation path;
        a concave end reflector disposed at an opposite end of the eyepiece body from the input lens to reflect the display light back along a reverse propagation path within the eyepiece body; and
        a viewing region disposed between the input lens and the concave end reflector and including a partially reflective surface, the partially reflective surface to redirect at least a portion of the display light traveling along the reverse propagation path out of an eye-ward side of the eyepiece body along an emission path,
    wherein the partially reflective surface is obliquely angled relative to the eye-ward side and the concave end reflector is titled relative to a top or bottom surface of the eyepiece body to collectively cause the emission path of the display light to be oblique to a first normal vector of the eye-ward side in two orthogonal dimensions,
    wherein the input lens is tilted such that a second normal vector from a center point of the input lens is obliquely angled relative to the top or bottom surface of the eyepiece body.

2. The eyepiece of claim 1,
    wherein the partially reflective surface is obliquely angled with an offset from 45 degrees relative to the eye-ward side to cause the emission path to have a first oblique angle in a horizontal dimension relative to the first normal vector of the eye-ward side,
    wherein the concave end reflector is tilted such that a third normal vector from a center point of the concave end reflector is obliquely angled relative to the top or bottom surface of the eyepiece body to cause the emission path to have a second oblique angle in a vertical dimension relative to the first normal vector of the eye-ward side,
    wherein the vertical dimension and the horizontal dimension comprise the two orthogonal dimensions.

3. The eyepiece of claim 2, wherein the first oblique angle is 6 degrees±1 degree, the offset from 45 degrees of the partially reflective surface is 2 degrees±1 degree, the second oblique angle is 6.7 degrees±1 degree, the second normal vector from the center point of the input lens is obliquely angled relative to the top or bottom surface of the eyepiece body by 1.4 degrees±1 degree, and the third normal vector from the center point of the concave end reflector is obliquely angled relative to the top or bottom surface of the eyepiece body by 2.1 degrees±1 degree.

4. The eyepiece of claim 1, wherein the top and bottom surfaces are flat and planar.

5. The eyepiece of claim 4, wherein the eye-ward side of the eyepiece body is flat and planar and substantially perpendicular to the top and bottom surfaces.

6. The eyepiece of claim 5, wherein the eyepiece body is configured to be coupled to a head mounted display that holds the eyepiece body substantially level above an eye of a user and angles an end of the eyepiece body proximate to the input lens towards a temple region of the user such that the user looks straight forward and up to align the eye with the emission path of the display light.

7. The eyepiece of claim 1, further comprising:
    a display panel for generating display light,
    wherein the second normal vector from the center point of the input lens obliquely intersects the display panel in at least one dimension.

8. The eyepiece of claim 1, wherein the eyepiece body has a first cross-section size and the input lens has a second cross-section size smaller than the first cross-section size.

9. The eyepiece of claim 8, wherein a step interface between the first cross-section size and the second cross-section size is coated with an opaque material.

10. The eyepiece of claim 1, further comprising:
    a gap between the partially reflective surface and the eye-ward side of the eyepiece body such that the partially reflective surface does not extend to the eye-ward side of the eyepiece body.

11. A head wearable display for providing display light to an eye of a user, the head wearable display, comprising:
    a display panel for generating display light;
    an eyepiece body, including:
        an input lens positioned to couple the display light into the eyepiece body along a forward propagation path;
        a concave end reflector disposed at an opposite end of the eyepiece body from the input lens to reflect the display light back along a reverse propagation path within the eyepiece body; and
        a viewing region disposed between the input lens and the concave end reflector and including a partially reflective surface, the partially reflective surface to redirect at least a portion of the display light traveling along the reverse propagation path out of an eye-ward side of the eyepiece body along an emission path; and
    a frame assembly to support the eyepiece body and the display panel for wearing on a head of the user with the viewing region positioned above the eye of the user,
    wherein the partially reflective surface is obliquely angled relative to the eye-ward side and the concave end reflector is titled relative to a top or bottom surface of the eyepiece body to collectively cause the emission path of the display light to be oblique to a first normal vector of the eye-ward side in two orthogonal dimensions.

12. The head wearable display of claim 11, wherein the input lens is tilted such that a second normal vector from a center point of the input lens is obliquely angled relative to the top or bottom surface of the eyepiece body.

13. The head wearable display of claim 12,
    wherein the partially reflective surface is obliquely angled with an offset from 45 degrees relative to the eye-ward side to cause the emission path to have a first oblique angle in a horizontal dimension relative to the first normal vector of the eye-ward side, wherein the concave end reflector is tilted such that a third normal vector from a center point of the concave end reflector is obliquely angled relative to the top or bottom surface of the eyepiece body to cause the emission path to have a second oblique angle in a vertical dimension relative to the first normal vector of the eye-ward side, wherein the vertical dimension and the horizontal dimension comprise the two orthogonal dimensions.

14. The head wearable display of claim 12, the second normal vector from the center point of the input lens obliquely intersects the display panel in at least one dimension.

15. The head wearable display of claim 11, wherein the top and bottom surfaces are flat and planar.

16. The head wearable display of claim 15, wherein the eye-ward side of the eyepiece is flat and planar and substantially perpendicular to the top and bottom surfaces.

17. The head wearable display of claim 16, wherein the frame holds the eyepiece body substantially level above the eye of the user and angles an end of the eyepiece body proximate to the display panel towards a temple region of the user such that the user looks straight forward and up to align the eye with the emission path of the display light.

18. The head wearable display of claim 11, wherein the eyepiece body has a first cross-section size and the input lens has a second cross-section size smaller than the first cross-section size.

19. The head wearable display of claim 18, wherein a step interface between the first cross-section size and the second cross-section size is coated with an opaque material.

20. The head wearable display of claim 11, further comprising:

a gap between the partially reflective surface and the eye-ward side of the eyepiece body such that the partially reflective surface does not extend to the eye-ward side of the eyepiece body.

* * * * *